Sept. 24, 1935.  A. P. STEINER ET AL  2,015,414
HYDRAULIC INDEXING MECHANISM
Filed Aug. 29, 1929   2 Sheets-Sheet 1
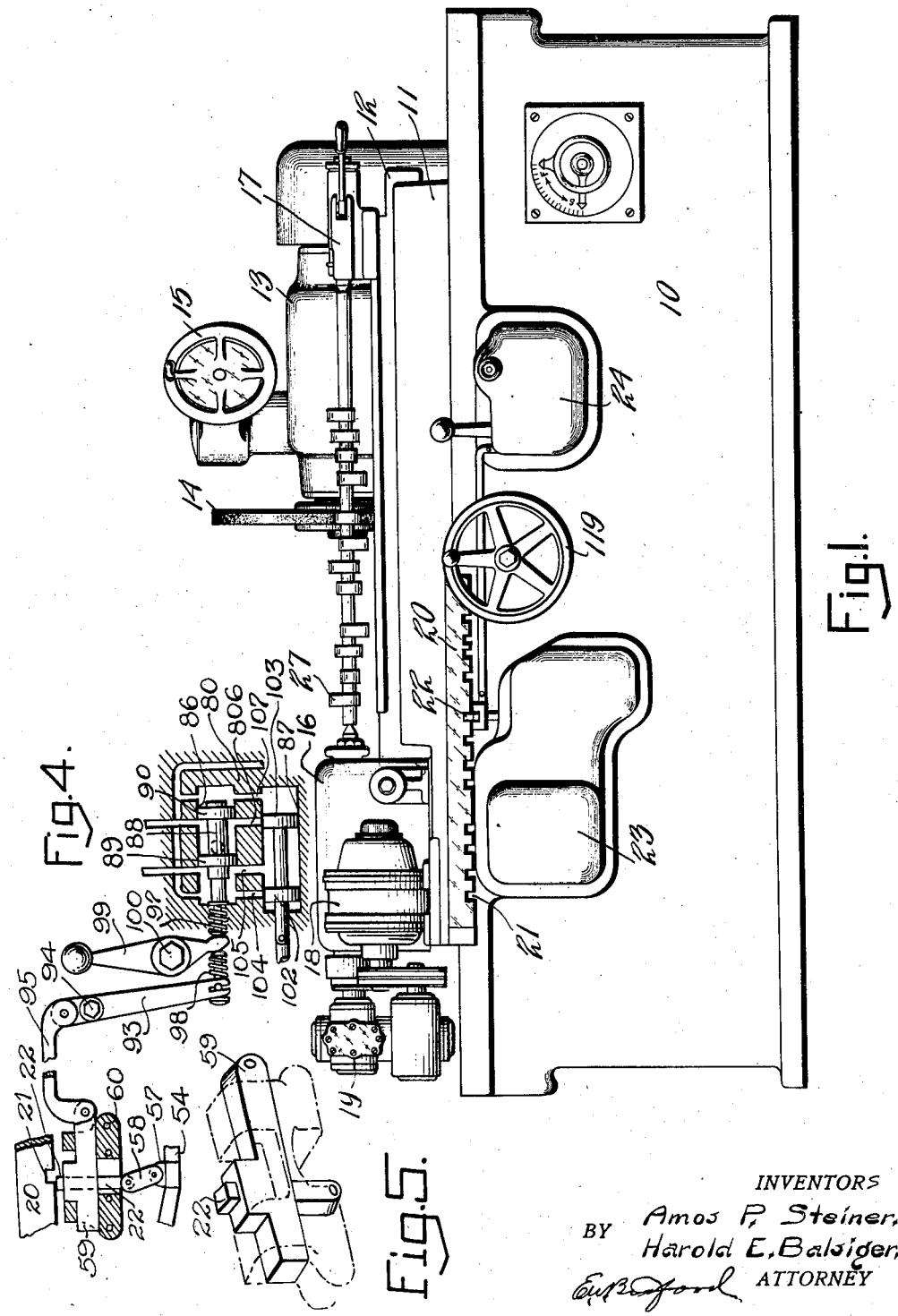
INVENTORS
Amos P. Steiner,
BY Harold E. Balsiger,
ATTORNEY

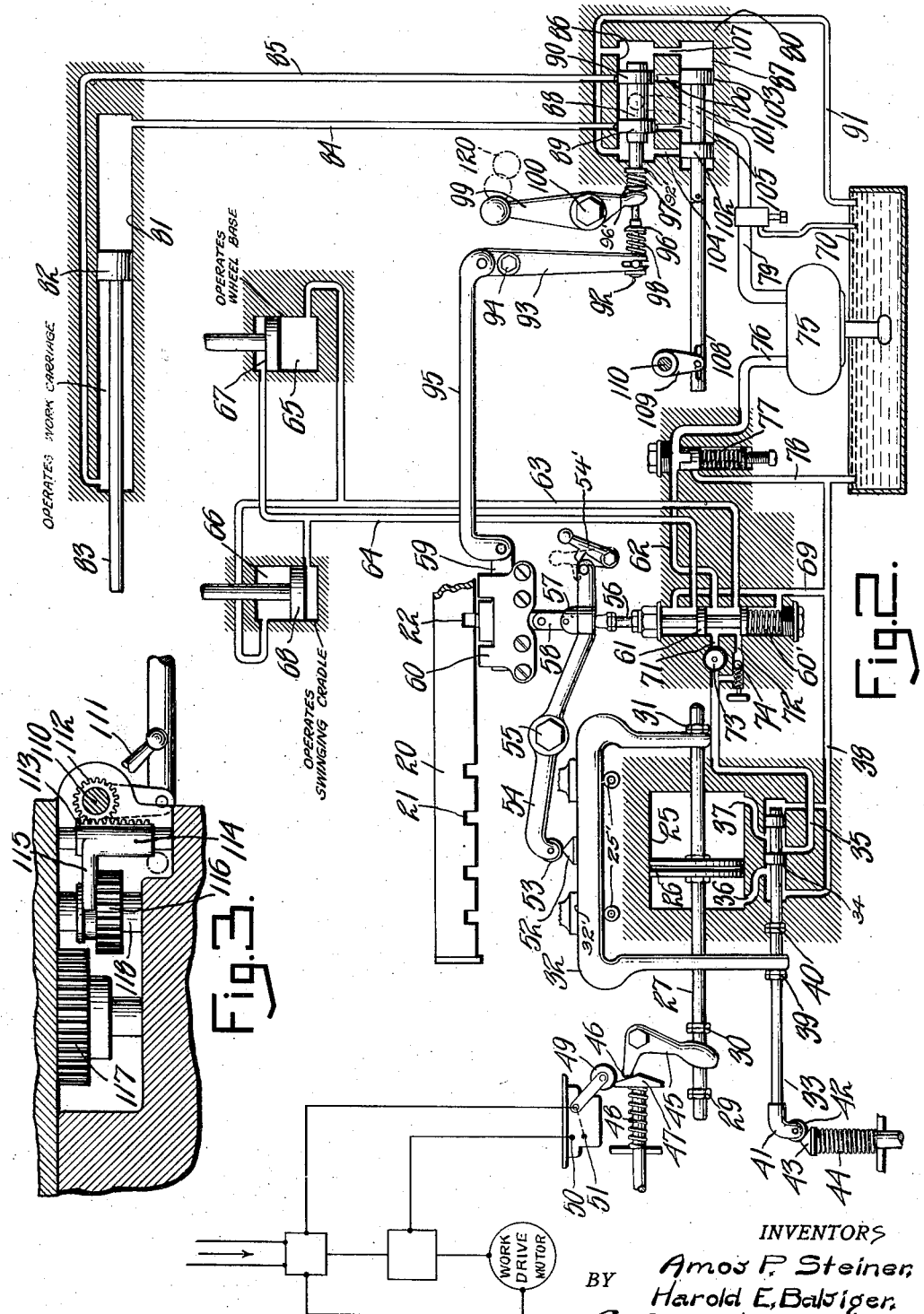

Patented Sept. 24, 1935

2,015,414

UNITED STATES PATENT OFFICE 2,015,414

HYDRAULIC INDEXING MECHANISM

Amos P. Steiner and Harold E. Balsiger, Waynesboro, Pa., assignors to Landis Tool Company, Waynesboro, Pa., a corporation of Pennsylvania Application August 29, 1929, Serial No. 389,278

31 Claims. (Cl. 51—72)

This invention relates to cam grinding machines and particularly to hydraulic indexing mechanism for such machines and is an improvement over the indexing mechanism shown in the copending application of Amos P. Steiner, Edgar P. Wine, Conrad L. Ott, and Harold E. Balsiger, Serial No. 384,068, filed August 7, 1929 for Cam grinding machines.

The invention in this application deals with means for controlling automatically the cycle of operation described in the copending application above referred to and the object is to provide mechanism which will be simple and hence less expensive to build than that described in the above application and yet which will function efficiently.

A further object is to provide a large number of variations in the length of the cycle of operations.

A further object is to provide a new indexing mechanism which will be positive in action and to provide for over-travel of the work carriage at each indexing operation and yet to accurately position the work at each indexing step.

Referring to the accompanying drawings, which are made a part hereof and on which similar reference characters indicate similar parts, Figure 1 is a front elevation of a cam grinding machine having my invention applied thereto, Figure 2 is a somewhat diagrammatic view of the various hydraulic and electrically operated mechanisms showing their interrelation.

Figure 3 is a partial plan view partly in section showing mechanism for manually traversing the work carriage.

Figures 4 and 5 show details of the control valves and locking device for the work table.

Since this application is an improvement on the copending application referred to only such mechanism will be described as is necessary for a full understanding of the improved devices, reference being had to the copending application for a more complete understanding of the machine as a whole to which the invention is applied.

Reference character 10 indicates the bed of a grinding machine having a work carriage 11 mounted thereon and a swinging cradle 12 mounted on the work carriage. A grinding wheel base 13 is mounted on the machine base and has a grinding wheel 14 mounted therein. The grinding wheel may be moved toward and from the work by means of a hand wheel 15. Headstocks and tailstocks 16 and 17 are mounted on the swinging cradle. Numeral 21 denotes the cam shaft which is to be ground. The headstock may be driven by means of a motor 18 driving through speed reducing gears within a casing 19. Spacing bar 20 is secured to one side of the work carriage and has notches 21 in its lower side. An indexing plunger 22 engages in the notches 21 of the spacing bar to position the work carriage in its several positions corresponding to cams to be ground on the work. The mechanism for timing the indexing of the work carriage is enclosed within a cover 23 and control valves for the motor which operate the indexing of the work carriage are shown at 24. The details of the timing mechanism and the details of the valves just mentioned are more clearly shown in Figure 2, although shown in a somewhat diagrammatic way. The timing mechanism consists of a cylinder 25 having a piston 26 movable therein, the piston having a piston rod 27 extending to the exterior. One end of the piston rod has spaced nuts 29 and 30 and the other end has a nut 31. While the nuts 29, 30, 31 have been spoken of as single nuts, each, as a matter of fact, is a pair of nuts, one serving to lock the other. A shifting yoke 32 is mounted to ride on rollers 25' and is guided by guides 32'. The rod 27 passes through depending arms of the yoke which arms are engageable by nuts 30 and 31. The yoke also has its one end mounted on a rod 33 which is an extension of the stem of a valve 34 which controls fluid ports 35, 36, 37, and 38 to and from the cylinder 25. The rod 33 has nuts 39 and 40 spaced apart, the end of the yoke 32 engaging between these nuts. The outer end of the rod 33 has a roller support 41 carrying a roller 42 which rests upon a cam plunger 43, the plunger 43 being urged toward the roller 42 by means of a spring 44. The cam plunger 43 aided by the spring 44 holds the valve 34 in its right or left position. The nuts 29 and 30 on the shaft 27 upon movement of the shaft 27 act to shift a lever 45 which on its other end has a roller 46 which engages a cam plunger 47. The cam plunger 47 is urged toward the roller 46 by a spring 48. The cam 47 is urged in a direction to press against a roller 49 to hold open contacts 50 and 51 of a limit switch. The limit switch controls circuits more fully described in the copending application, the purpose of which is to slow down the work rotating motor as the work nears completion. The yoke 32 has an inverted cam block 52 mounted on its upper side which cam engages a roller 53 on a lever 54. The lever 54 is pivoted at 55 and has its other end resting upon the top of a valve stem 56.

The lever 54 has a lug 57 on its upper side to which is pivotally attached a link 58, the link in turn being attached to the lower end of the plunger 22. The plunger passes through a movable bracket 59 which is slidable in a stationary bracket 60 on the front of the machine bed. The stem 56 has valve disks 61 which control pressure fluid from the pipe 62 to the pipes 63 and 64 which lead to cylinders 65 and 66 in which pistons 67 and 68 operate to move the wheel base and swinging cradle respectively. Numeral 69 indicates an exhaust line which conducts fluid from the valve chamber to a reservoir 70. Ports 71 and 72 connect the valve chamber with the fluid line 35 to timing cylinder 25. Passage of fluid through port 71 is controlled by a needle valve 73 and the port 72 has a ball check valve 74 positioned therein and adapted to open outwardly from the valve chamber. The check valve also acts as a throttle valve to control the amount of fluid entering the cylinder when the valve is in the position shown in Figure 2. The valve 74 is spring pressed upon its seat, the tension of the spring being adjustable. The needle valve 73 is always normally open whereas port 72 is open only when the valve disks are in the lowermost position, as shown in Figure 2. A pump 75 delivers pressure fluid through a line 76 to the line 62. A pressure operated by-pass 77 permits excess fluid to pass to the reservoir through a line 78. Another pressure fluid line 79 leads from the pump 75 to a reversing valve 80 through which valve, fluid passes to work traverse cylinder 81. The cylinder 81 has a piston 82 movable therein to which piston is connected a rod 83 which is connected to the work traverse carriage 11. Fluid lines 84 and 85 pass from the control valve to opposite ends of the cylinder 81. The control valve 80 has a pair of chambers 86 and 87 therein. The chamber 86 has a reversing valve 88 which consists of a pair of spaced disks 89 and 90 which control the flow of fluid from the pressure line 79 to the lines 84 and 85 and exhaust from the lines 84 and 85 to an exhaust line 91 to the reservoir 70. The valve 88 has a stem 92 which extends out one end of the valve chamber and is pivotally attached at its outer end to a lever 93 which is pivoted at 94 to the bed of the machine. The upper end of the lever 93 is connected by a link 95 to the bracket 59. Collars 96 and 96' are positioned on the stem 92 and compression springs 97 and 98 are biased to urge these collars toward each other. A reversing lever 99 is pivoted at 100 and has its lower end between the collars 96 and 96'. The outer end of the spring 97 presses against a flange 92' on the stem 92. Within the chamber 87 is positioned a by-pass valve 101 which consists of spaced disks 102 and 103. The disks 102 and 103 control ports 104, 105, 106, and 107. The outer stem 108 of the valve is slotted to allow lost motion and pivotally attached to an arm 109 which is secured to a shaft 110. On the other end of the shaft is secured a lever 111 and a pinion 112. The pinion 112 engages rack 113 of a bracket 114 which has a finger 115 extending from one side. The finger 115 engages a collar on a pinion 116 to move this pinion into and out of engagement with a pinion 117. The pinion 117 drives a rack for traversing the work carriage. The pinion 116 is mounted on a shaft 118 which extends to the front of the machine bed and has a wheel 119 mounted thereon by means of which the work carriage may be manually traversed.

The operation of the device is as follows: Assume the parts in the position in which they are shown diagrammatically in Figure 2, the piston 26 is moving to the left and has reached the position at which the valve stem 56 is depressed so that the port 72 is open, pressure fluid entering from the line 62 will pass through the check valve 74 into the line 35 and through the port 37 to the right of the piston 26 to continue to move the piston 26 to the left. It will now quickly move to the left since fluid may freely flow through the check valve mentioned. Pressure fluid likewise is free to flow from line 62 through line 63 into cylinders 65 and 66 to withdraw the wheel base from grinding position and to operate the piston 68 to move the swinging cradle to withdraw the work out of working position. In withdrawing plunger 22 and shifting valve 61, said plunger and valve are so constructed that the valve directs fluid to the wheel base and cradle on the first part of the movement before the plunger has been completely withdrawn. Thus it is impossible for the carriage to start before the wheel and cradle have been withdrawn. When plunger 22 is withdrawn from spacing bar 20 said plunger is urged to slide to the left in bracket 60 by spring 97 acting thru lever 93 and link 95. The plunger 22 is thus placed in such a position that if the carriage fails to traverse said plunger will not return to the notch and thus allow valve 61 to shift and return the wheel base and cradle to grind the same cam over again. Said spring 97 acts at the same time to shift valve 88 to direct fluid to move carriage drive piston 82 to the right.

When a new cam has been placed in position before the grinding wheel and plunger 22 drops into one of the notches 21 in spacing bar 20, the movement of the carriage carries the plunger a short distance in the same direction against the action of spring 97. This shifting the plunger prepares it for the next withdrawal and also acts thru link 95 and lever 93 to shift valve 89 to neutral position and thus stops the carriage movement. In case the carriage moves too far, the valve 89 likewise moves past central position and opens up a port to reverse the carriage and return it to proper position. These operations all take place substantially simultaneously. As soon as the piston 26 reaches the limit of its travel to the left as it will in an instant after the time at which it is moved to the position shown in Figure 2, nut 31 will move member 32 to the left and depending arm at the left of 32 engaging the nut 39 will shift the valve 34 to close port 37 and port 36 and stop movement of piston 26. At this point roller 42 will have moved almost to the top of cam 43. Valve 34 will be shifted by piston 26 through arm 32 to a position to shut off both ports thus preventing further movement of piston 26 until the shifting of said valve has been completed. Also at this point cam 52 on arm 32 will have moved slightly past the center of roller 53. When plunger 22 enters another notch, spring 60' will move arm 54 in a counter clockwise direction about pivot 55. The downward pressure of roller 53 on cam 52 will cause arm 32 to move to the left thus shifting valve stem 33 so that roller 42 moves past the center of cam 43 and permitting cam 43 and spring 44 to shift valve 34 to direct fluid from valve 73 thru port 36 to cause piston 26 to move slowly to the right. When plunger 22 enters another notch spring 60' will also shift valve 61 to direct fluid away from by-pass 72 and thru valve 73 to the timing position 26 and thru line 64 to work cradle cylinder 66 and wheel base cylinder 65 to return the work and tool to operative position. As soon as the valve 61 uncovers the pressure fluid line 64, pressure fluid will pass from 62 through 64 into cylinders 65 and 66 to move the wheel base into grinding position and to move the swinging cradle to position the work against the grinding wheel. The machine will then continue grinding a cam as long as the piston 26 is traveling to the right. The time necessary for the piston to move to the right is determined by the restriction at 73. The timing of the grinding of a cam therefore is controlled by the controllable needle valve 73. After all of the cams have been ground the reversing lever 99 is moved clockwise to the position shown at dotted lines 120. The spring 98 is therefore put under compression so that valve 88 is shifted to the left to permit pressure fluid to pass from line 79 through line 84 to the cylinder 81. This moves the work carriage to the left at which time a piece of work may be removed and a new piece inserted. In case the operator wishes to traverse the work carriage manually he moves the lever 54' to engage a hook on the right of the lever 54 to hold it as shown in dotted line position in Figure 2. Lever 111 is then operated to move clutch 116 into engagement with 117 and at the same time through shaft 110 and arm 109 valves 102, 103 are moved to the right so that ports 105, 106 are in communication with each other. Lines 84 and 85 therefore are put into communication with each other so that the work carriage may be freely, manually moved by means of wheel 119. Elements 45 to 51 inclusive control operation of the work drive motor and as more fully described in the copending application referred to are so constructed that shifting of the lever 45 to the right or to the left depresses the cam 47 momentarily and during this depression the work drive motor is slowed down for a finishing speed drive.

It will be obvious to those skilled in the art that various changes may be made in our device without departing from the spirit of the invention and therefore we do not limit ourselves to what is shown in the drawings and described in the specification, but only as indicated by the appended claims.

We claim:

1. In a cam grinding machine having a grinding wheel, a work carriage, a work rotating motor, means for indexing the work carriage to position the work before the grinding wheel, means for timing the indexing operations comprising a fluid motor, a constantly open pressure fluid line to said motor, means for locking the work carriage in indexed position, means operated by said motor for releasing the locking means, and means operated by the said motor for slowing down the work rotating motor just prior to the release of the said locking means, substantially as set forth.

2. In a cam grinding machine having a base, a work carriage movable on the base, a grinding wheel movable toward and from the work carriage, a motor for rotating the work, means for indexing the work carriage past the grinding wheel comprising a fluid motor, means for locking the work carriage in indexed position, hydraulically operated means for timing the releasing of the locking means, and means operated by the hydraulically operated means for slowing down the speed of the work rotating motor just prior to the release of the locking means, substantially as set forth.

3. In a cam grinding machine having a grinding wheel and a work carriage, means for timing the indexing of the work carriage, to position portions of the work to be ground before a grinding wheel comprising a fluid motor, a reversing valve for controlling admission and exhaust of fluid to said motor, a pressure fluid line to said motor having an adjustable valve therein, a by-pass around said adjustable valve, and means for opening said by-pass passage, during the indexing of the work carriage, to quickly reverse the said fluid motor, substantially as set forth.

4. In a cam grinding machine having a work carriage and a grinding wheel, means for moving the work carriage past the grinding wheel and for locking it in indexed positions before the grinding wheel comprising a notched bar on the work carriage, a plunger engageable with the notches in the bar, a constantly operated fluid motor for releasing said locking means at predetermined intervals, means for controlling motive fluid to said motor, means on said motor for releasing the locking means, means operating just before its release from the notches in the spacing bar to admit additional fluid to said motor to speed up the motor, substantially as set forth.

5. In a cam grinding machine, a work carriage, a work cradle, a wheel base, a grinding wheel mounted on said wheel base, power means to drive the work carriage, power means to drive the wheel base, means to withdraw the cradle to inoperative position, and a hydraulically operated timing device for controlling operation of all the above mentioned means and automatic means for controlling the speed of operation of the said hydraulically operated timing device, substantially as set forth.

6. In a grinding machine, a work carriage a work cradle, a wheel base, a grinding wheel mounted on said wheel base, power means to operate the carriage and the wheel base, means to withdraw the cradle to inoperative position, automatic means to vary the work speed, and a timing mechanism to cause the various functions to operate at the proper time, said last named means comprising a fluid motor having a restricted pressure fluid line thereto and means for controlling the restriction to regulate the timing device substantially as set forth.

7. In an automatic grinding machine, a work carriage, means for traversing said carriage, a wheel base, mechanism for controlling the grinding time on the work and initiating withdrawal of said wheel base comprising a fluid motor, and means to stop said motor while said carriage is traversing, substantially as set forth.

8. In an automatic grinding machine, a traversing work carriage, means for traversing said carriage, a wheel base, means for moving said wheel base, a timing mechanism to time the grinding operation on the work and initiate return movement of said wheel base comprising a fluid motor and means to stop said motor while said carriage is in motion, and means to start it again when said carriage comes to rest, substantially as set forth.

9. In an automatic grinding machine, a movable work carriage, a movable wheel base mechanism for actuating said carriage and said wheel base, timing mechanism to time the operation of said mechanisms, comprising a fluid motor means actuated by said motor to start said mechanisms, and automatic means to start and stop said motor at varying intervals, substantially as set forth.

10. In an automatic grinding machine, a movable work carriage, a movable wheel base mechanisms for actuating said carriage and said wheel base, timing mechanism to time the operation of said mechanisms comprising a fluid motor, means actuated by said motor to start said mechanisms and automatic means to stop said motor at each end of the traverse of said carriage, substantially as set forth.

11. A timing device for a cam grinding machine comprising a carriage for supporting a workpiece having thereon the cams to be ground, a motor for moving said carriage, means for locking the carriage in any one of a plurality of positions, means for releasing the locking means, a fluid motor for timing the intervals between the releasing operations, and means for controlling the speed of operation of said motor to control the time of grinding each cam, substantially as set forth.

12. In a machine tool having a tool support, a tool mounted thereon, a work carriage and power means for traversing said carriage, a plunger engageable with any one of a plurality of sockets in the carriage for stopping the carriage in any one of a number of predetermined positions, a hydraulic motor for releasing said locking means at predetermined intervals, a pressure fluid line to said motor, said fluid line having a restricted portion to control the speed of the said motor, a by-pass passage around said portion to speed up the motor at a predetermined point in its operation, substantially as set forth.

13. In an automatic cam grinding machine, a work carriage, a hydraulic motor for traversing said carriage, a wheel base a grinding wheel mounted on said base, a hydraulic motor for moving said wheel base toward and from the work carriage, a valve in control of the movements of the work carriage and the wheel base, means for locking the work carriage in any one of a plurality of positions corresponding to cams to be ground, a hydraulic motor for controlling said locking means, said motor being also in control of the valve which controls the wheel base and the work carriage, the said valve in turn preventing operation of the said motor when the work carriage and wheel base are moving relative to each other, substantially as set forth.

14. A timing device for a cam grinding machine having a work carriage and a wheel base, a motor for traversing the work carriage, a separate motor for moving the wheel base toward and from the work carriage, valves in control of said motors, a device for locking the work carriage in any one of a number of predetermined positions corresponding to the work to be ground, a hydraulic motor in control of said locking means, said motor also controlling the said valves which controls motive fluid for operating the work carriage and the wheel base, one of said valves also controlling passage of fluid to the said hydraulic motor to prevent operation of said motor during relative movement of the wheel base and the work carriage, substantially as set forth.

15. In a machine of the kind described, a support, means for providing intermittent longitudinal movement of said support, an indexing mechanism, means for actuating said mechanism, and means for rendering said actuating means inoperative until longitudinal movement of the support has taken place.

16. In a machine of the kind described, a support, means for providing intermittent longitudinal movement of the support, a timing and indexing mechanism, means for actuating said timing and indexing mechanism, and means for rendering said actuating means inoperative before said longitudinal movement takes place, and means for starting said timing mechanism again after said longitudinal movement has been completed.

17. In a machine of the kind described, a carriage, pressure fluid means for causing an intermittent longitudinal movement to said carriage comprising a timing and indexing mechanism, a valve in control of said fluid means, means to set said valve to direct fluid to move the carriage in one direction, means for holding said valve in a neutral position, and means responsive to the timing mechanism for shifting said valve to cause said carriage movement.

18. In a machine of the kind described, a work support, a tool support, pressure fluid means to provide a relative transverse and longitudinal movement to said supports, a spacing bar on one of said supports, a plunger adapted to engage selected portions of said spacing bar, a timing mechanism for withdrawing said plunger, means responsive to a partial withdrawal of said plunger to actuate one of said supports, and means responsive to a complete withdrawal of said plunger to actuate said other support.

19. In a machine of this kind described a work support, a tool support, mechanisms to provide relative transverse and longitudinal movements of said supports, a timing and indexing mechanism in control of said movements, control means to vary the speed of said timing and indexing mechanism said control means being actuated by said timing and indexing mechanism.

20. In a machine of the kind described, a carriage, means to impart intermittent movement of said carriage, a notched spacing bar mounted thereon, a plunger adapted to engage notches on said bar, means to withdraw said plunger from said bar at intervals, comprising a timing mechanism and means independent from said carriage movement to prevent return of said plunger to the same notch.

21. In a machine of the kind described, a carriage, means to impart intermittent movement of said carriage, a valve in control of said means, a spacing bar, a plunger adapted to engage notches on said bar, means to withdraw said plunger from said bar at intervals comprising a timing mechanism, means to prevent the return of said plunger to the same notch, said last named means being effective to shift said valve to start said carriage.

22. In a machine of the kind described, a carriage, means to impart movement of said carriage, a spacing bar on said carriage, a plunger adapted to engage selected portions of said bar to prevent movement of the carriage, means to actuate said plunger comprising a timing mechanism and means responsive to withdrawal of said plunger to complete the movement of the timing mechanism at a faster rate.

23. In a machine of the kind described, a carriage, means to effect movement of said carriage, a spacing bar on said carriage, a plunger adapted to engage selected portions of said bar to prevent movement of the carriage, means to actuate said plunger comprising a timing mechanism, means responsive to withdrawal of said plunger to stop said timing mechanism and said means being actuated on return of said plunger to said spacing bar to start said timing mechanism.

24. In a machine of the kind described, a work support, a tool support, fluid means to provide relative transverse and longitudinal movements of said supports, a valve in control of each of said movements, a fluid operated timing mechanism, means responsive to said timing mechanism to actuate one of said valves, and thereafter to move to actuate said second valve.

25. In a machine of the kind described, a fluid operated timing mechanism, an automatic reversing valve therefor, a valve adapted to be shifted in one direction by said timing mechanism and in the opposite direction by a spring, a reversing cam movable by said timing mechanism and adapted to effect said shifting movement, means responsive to said timing mechanism to shift said reversing valve to neutral position, and means actuated by said spring to complete the movement of said reversing valve to reverse said timing mechanism.

26. In a machine of the kind described a carriage, means to effect movement of said carriage, means to effect said movement intermittently, comprising a spacing bar on said carriage, a plunger adapted to engage selected portions of said bar to prevent movement of the carriage, a timing mechanism to actuate said plunger and thereafter to effect a quick movement to release said plunger, to permit it to engage another portion of said spacing bar.

27. In a machine of the kind described a work support, a tool support, fluid mechanisms to effect relative longitudinal and transverse movements of said supports, a timing mechanism in control of said movements, comprising a piston and cylinder and having an operative cycle consisting of a stroke of said piston in one direction, a valve actuated by said timing mechanism for starting and stopping said movements and means to cause said motor to move more rapidly, to complete its cycle after it has actuated said valve.

28. In a machine of the kind described a work carriage, mechanism to provide longitudinal movement of said carriage, mechanism to effect said movement intermittently comprising a reversing valve, a spacing bar on said carriage, notches in said spacing bar, a plunger adapted to be moved into and out of said notches, connections between said plunger and said reversing valve, said plunger being so mounted as to permit it to move a short distance in the direction of movement of the carriage, and means responsive to said plunger movement to shift said reversing valve and stop said carriage drive mechanism.

29. In a machine of the kind described a work carriage, mechanism to provide longitudinal movement of said carriage, mechanism to effect said movement intermittently comprising a reversing valve, a spacing bar on said carriage, notches in said spacing bar, a plunger adapted to be moved into and out of said notches, connections between said plunger and said reversing valve, said plunger being so mounted as to permit it to move a short distance in the direction of movement of the carriage, and means responsive to said plunger movement to shift said reversing valve and stop said carriage drive mechanism, said means being responsive to an overtravel of the carriage to reverse said valve and cause said carriage to move in the opposite direction until said valve is again centered to stop said movement.

30. In a machine of the kind described a work support, a tool support, mechanism to provide relative longitudinal movement of said supports, mechanism to effect said movement intermittently including a spacing device on one of said supports, a reversing mechanism in control of said moving mechanism, mechanism adapted to cooperate with said spacing device to stop said support in a series of predetermined positions, and connections from said mechanism to said reversing mechanism whereby the movement of said support is utilized to shift said reversing mechanism and stop said movement at one of said predetermined positions.

31. In a machine of the kind described a work support, a tool support, mechanism to provide relative longitudinal movement of said supports, mechanism to effect said movement intermittently including a spacing device on one of said supports, a reversing mechanism in control of said moving mechanism, mechanism adapted to cooperate with said spacing device to stop said support in a series of predetermined positions, and connections from said mechanism to said reversing mechanism whereby the movement of said support is utilized to shift said reversing mechanism and stop said movement at one of said predetermined positions, said connections being effective in the event of overtravel of said support to shift said reversing mechanism far enough to reverse the movement of said support and return it to said predetermined position.

AMOS P. STEINER.
HAROLD E. BALSIGER.